US012428265B2

(12) United States Patent
Matsumoto et al.

(10) Patent No.: US 12,428,265 B2
(45) Date of Patent: Sep. 30, 2025

(54) INSPECTION DEVICE AND INSPECTION METHOD FOR ELEVATING MACHINE

(71) Applicant: Hitachi Building Systems Co., Ltd., Tokyo (JP)

(72) Inventors: Toshiaki Matsumoto, Tokyo (JP); Masaru Kawasaki, Tokyo (JP); Yanzhou Song, Tokyo (JP)

(73) Assignee: Hitachi Building Systems Co., Ltd., Tokyo (JP)

( * ) Notice: Subject to any disclaimer, the term of this patent is extended or adjusted under 35 U.S.C. 154(b) by 1323 days.

(21) Appl. No.: 17/123,965

(22) Filed: Dec. 16, 2020

(65) Prior Publication Data

US 2021/0300724 A1 Sep. 30, 2021

(30) Foreign Application Priority Data

Mar. 24, 2020 (JP) ................................ 2020-052464

(51) Int. Cl.
*B66B 5/00* (2006.01)

(52) U.S. Cl.
CPC ................................ *B66B 5/0087* (2013.01)

(58) Field of Classification Search
CPC ................................ B66B 5/0087
USPC ................................ 187/393
See application file for complete search history.

(56) References Cited

U.S. PATENT DOCUMENTS

2010/0094798 A1* 4/2010 Shudo .................. G06V 20/52
706/54

FOREIGN PATENT DOCUMENTS

JP 2013-60295 A 4/2013
JP 2013060295 A * 4/2013
JP 2018167957 A * 11/2018 .......... B66B 5/0087

* cited by examiner

*Primary Examiner* — Kawing Chan
(74) *Attorney, Agent, or Firm* — Crowell & Moring LLP

(57) ABSTRACT

The present invention measures a sound generated from mechanical equipment, specifies an abnormal component from measurement data, indicates, if a plurality of specified components exists, an additional measurement position, and compares a plurality of measured data, to specify an arrangement position of the abnormal component.

4 Claims, 11 Drawing Sheets

FIG. 11

341

| No. | SOUND PATTERN | GENERATION COMPONENT | NUMBER OF INDIVIDUALS | COMPONENT ARRANGEMENT PATTERN IDENTIFICATION INFORMATION | SOUND COLLECTION POSITION IDENTIFICATION INFORMATION |
|---|---|---|---|---|---|
| 1 | ·CONTINUOUS SOUND<br>·RADIO FREQUENCY<br>(AAAA Hz –BBBB Hz) | TOP PULLEY | 2 | (1) | (1) |
| | | | | (2) | (2) |
| | | | | (3) | (3) |
| | | | | (4) | (4) |
| 2 | ·IMPACT SOUND<br>(CCCC Hz –DDDD Hz) | CABLE MACHINE CONTACT | 1 | – | – |

INSPECTION DEVICE AND INSPECTION METHOD FOR ELEVATING MACHINE

CLAIM OF PRIORITY

The present application claims priority from Japanese Patent Application JP 2020-052464 filed on Mar. 24, 2020, the content of which are hereby incorporated by references into this application.

BACKGROUND OF THE INVENTION

1. Field of the Invention

The present invention relates to a technique for measuring physical quantities such as sounds and vibrations generated by an operation of mechanical equipment. Among the mechanical equipment, elevating machines such as elevators and escalators are particularly targeted. Furthermore, the present invention relates to an inspection technique using measurement results of sounds and vibrations.

2. Description of the Related Art

Currently, physical quantities such as sounds and vibrations generated by an operation of mechanical equipment are measured and the results are used. For example, as a means for inspecting the operating status of components of an elevator, which is an example of the mechanical equipment, a method is known in which sounds, vibrations, and the like are measured and the results are compared with past normal data and abnormal data to determine soundness of each device. For example, JP 2013-60295 A discloses that two or more sound collecting units are provided inside or outside the elevator, and preprocessing is performed in which a sound source position is specified by the stereo principle to prevent erroneously detecting an environmental sound as an abnormal sound of the elevator.

SUMMARY OF THE INVENTION

However, in JP 2013-60295 A, since the sound collecting units are arranged in advance, it is not possible to perform a more appropriate inspection at a measurement position suitable for a position of an abnormal component. It means that in JP 2013-60295 A, although the sound source position can be specified, an appropriate inspection cannot be performed depending on a positional relationship between the abnormal component and the sound collecting units.

Furthermore, this problem occurs not only in the inspection (particularly, inspection of the abnormal component) but also in measuring physical quantities. For example, this problem also occurs in maintenance work that gives notice of a replacement time of a component, particularly a consumable, with a predetermined sound.

Therefore, an object of the present invention is to present a measurement position according to a component (including a device) to be measured when mechanical equipment such as elevating machines such as an elevator and an escalator is measured by use of a smart device.

In order to solve the above problems, the present invention is an elevating machine inspection device that inspects an elevating machine based on measurement data that is a result of measuring a sound generated from the elevating machine. The elevating machine inspection device includes a model selection unit that accepts a model of the elevating machine, a measurement unit that measures the measurement data of the elevating machine, a storage unit that stores a component table storing, for each model, components that form the elevating machine, sounds, and sound measurement positions in the model in association with each other, a component specification unit that refers to the component table and specifies a component generating a sound generated at the time of an abnormality, by use of a frequency component of the measurement data, and an output unit that outputs information for specifying a sound measurement position corresponding to the component specified by the component specification unit.

Note that the present invention also includes an inspection method performed by the inspection device and a computer program for implementing the inspection method.

Furthermore, the present invention also includes inspecting occurrence of abnormalities such as failures, failure signs, and faults and an arrival of a replacement time in the mechanical equipment.

According to the present invention, it is possible to present a remeasurement position according to a measurement target.

BRIEF DESCRIPTION OF THE DRAWINGS

FIG. 11 is a diagram illustrating an input sound-sound collection position correspondence table used in the embodiment of the present invention;

DESCRIPTION OF THE PREFERRED EMBODIMENTS

Figure 1:
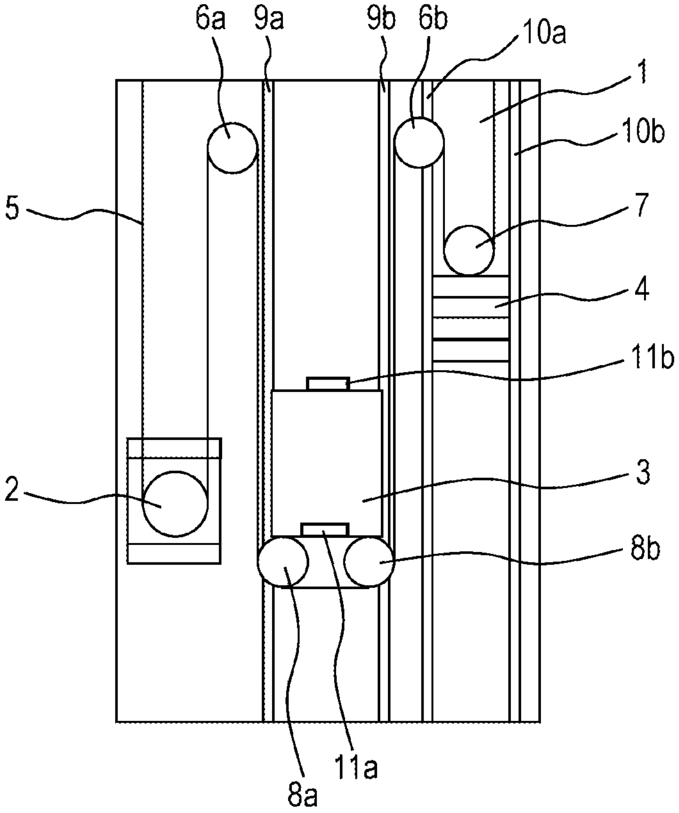
FIG. 1 is a schematic diagram illustrating an installation position of a smart device in an elevator in an embodiment of the present invention.

Hereinafter, an embodiment of the present invention will be described with reference to the drawings. In the present embodiment, an abnormality inspection of an elevator (elevating machine) as an example of mechanical equipment will be described. However, the present invention is not limited to the abnormality inspection as described later. For example, the present invention can be applied to determination of a replacement time and a remeasurement according to loudness of a sound. First, FIG. 1 is a schematic diagram illustrating installation positions of smart devices 11*a* and 11*b* installed as inspection devices in the elevator to be inspected in the present embodiment. The elevator to be inspected is an elevator without a machine room, and in a hoistway 1, a car 3 and a counterweight 4 are connected by a rope 5 via top pulleys 6*a* and 6*b*, car pulleys 8*a* and 8*b*, and a counterweight pulley 7. When the rope 5 is sent out by use of a motor 2, the counterweight 4 moves along counterweight rails 10*a* and 10*b*, and the car 3 moves up and down along car rails 9*a* and 9*b*.

FIG. 1 illustrates the smart device 11*a* installed in the car 3 (inside the car) during the abnormality inspection and the smart device 11*b* installed on the car 3 during the abnormality inspection. It is possible to perform a measurement while installation positions of the smart devices 11*a* and 11*b* are changed according to an object to be inspected, and sounds, vibrations, an acceleration, and the like are measured to make a determination. Note that, in FIG. 1, an example of installing two smart devices is given, but the number is not limited to this. Furthermore, a device other than the smart device may be used as long as the functions described later can be implemented.

Figure 10:
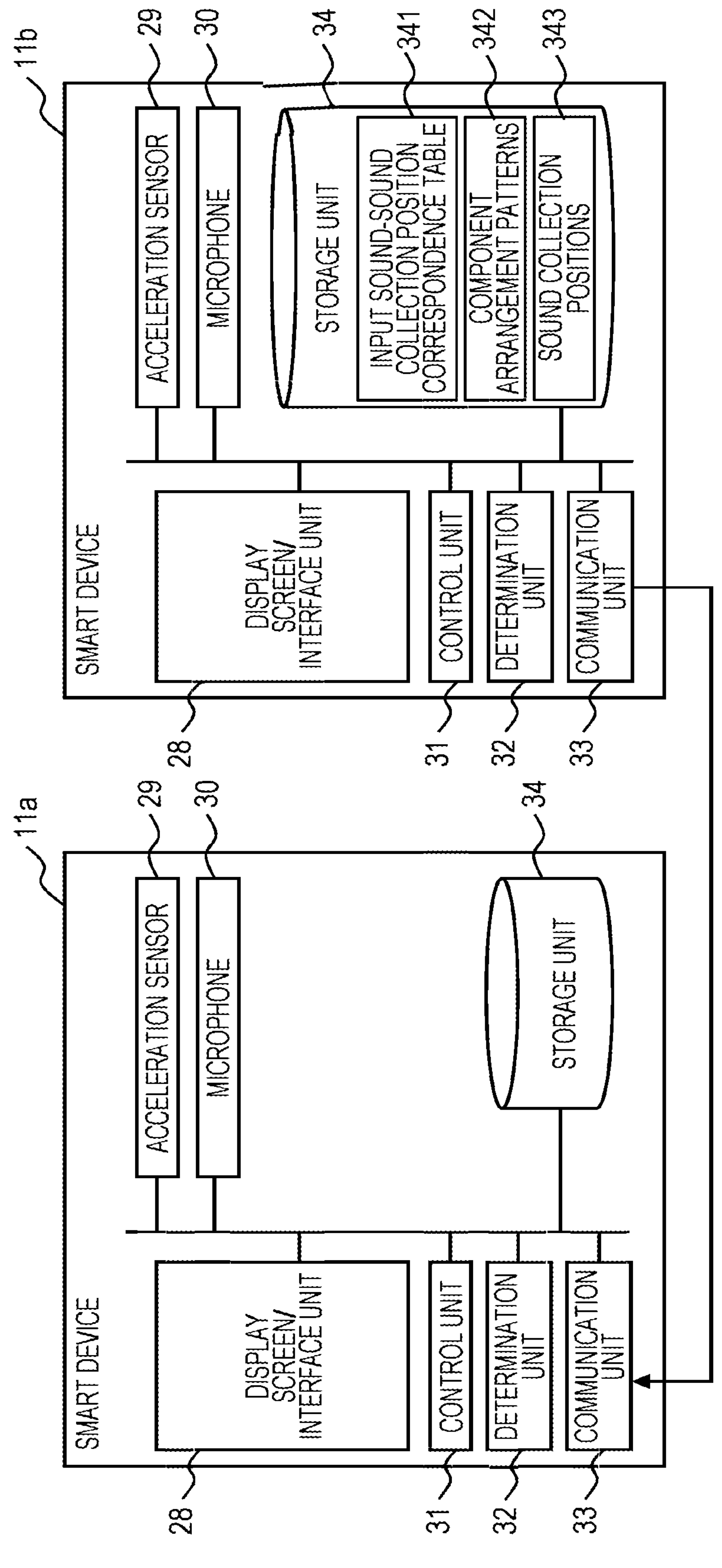
FIG. 10 is a configuration diagram of a system for executing the abnormality inspection in the embodiment of the present invention.

In addition, FIG. 10 illustrates configurations of the smart devices 11*a* and 11*b* and a system configuration for the abnormality inspection. Here, the configurations of the smart devices 11 will be described. First, each of the smart devices 11*a* and 11*b* includes various sensors that are measurement units. The sensors include an acceleration sensor 29 and a microphone 30. Note that another sensor such as a speed sensor may be added, and a part of the sensors may be omitted.

In addition, each of the smart devices 11*a* and 11*b* includes a display screen/interface unit 28 that displays various information and further accepts input from a user (inspector). The display screen/interface unit 28 can be implemented by a so-called touch panel.

Furthermore, in a case where the plurality of smart devices 11 is used for a measurement, the smart device 11*a* includes a communication unit 33 that connects to another smart device 11*b*. Furthermore, each of the smart devices 11*a* and 11*b* includes a storage unit 34 that stores various information, a control unit 31 that performs calculations according to a program and an application stored in the storage unit and read into a random access memory (RAM), and a determination unit 32 that determines results. Note that the determination unit 32 may be implemented as an application, and processing of the determination unit 32 may be executed by a calculation in the control unit 31. Note that each of these configurations is connected via a bus or the like.

The present inspection may be performed by any one of the smart devices 11*a* and 11*b* illustrated in FIG. 1. That is, the smart devices 11*a* and 11*b* are used as abnormality inspection devices. Furthermore, the sensors may be installed in the elevator, and the abnormality inspection may be performed by a server device via the sensors and a network. In this case, the number of sensors may be plural or singular. Furthermore, the smart device may be used as the sensor.

Hereinafter, in the present embodiment, processing performed by the smart device 11*a* or 11*b* alone (hereinafter, simply the smart device 11) will be mainly described.

Figure 2:
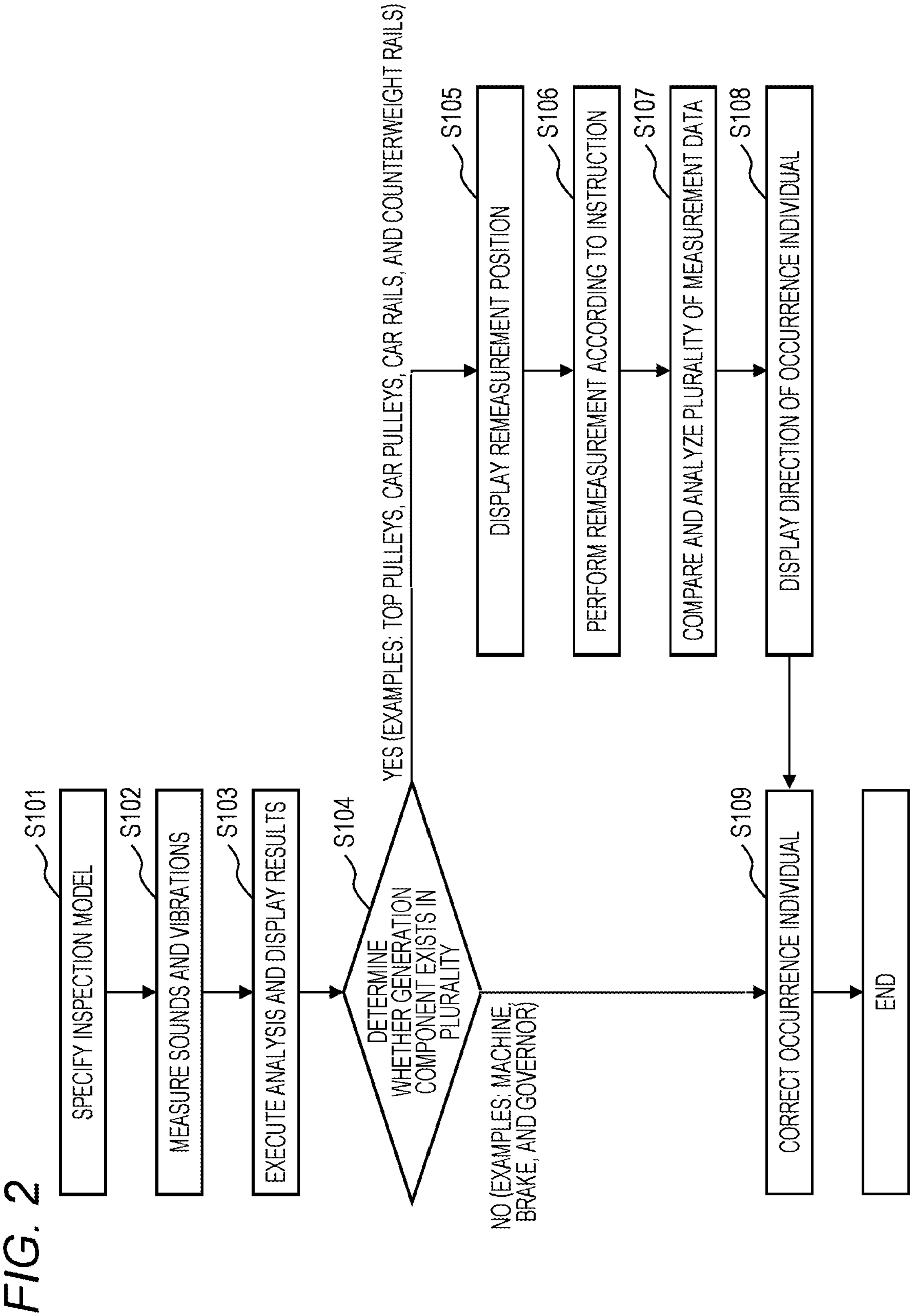
FIG. 2 is a flowchart illustrating a determination flow of abnormality inspection in the embodiment of the present invention.

FIG. 2 is a flowchart illustrating a determination flow of the abnormality inspection in the present embodiment.

First, in step S101, when the abnormality inspection is started, the control unit 31 specifies an inspection model peculiar to the elevator to be inspected. First, the control unit 31 accepts input to specify the elevator to be inspected from the user to the display screen/interface unit 28. The control unit 31 then specifies an inspection model corresponding to this input. In addition, instead of the storage unit 34, input of the inspection model from the server device connected via the network may be accepted. Note that the above input includes, for example, an identifier that specifies an elevator model, an elevator installation location, building, or site, or the like.

Here, the inspection model includes information indicating a characteristic of each component forming the elevator. The characteristic includes information for determining an abnormality, such as a frequency characteristic at the time of the abnormality. In addition, the inspection model also includes information indicating arrangement of each component in the elevator.

Next, in step S102, sounds and vibrations generated when the elevator is driven are measured by the microphone 30 and the acceleration sensor 29, respectively. These sounds and vibrations are called measurement data.

In step S103, the determination unit 32 then executes an analysis on the measured measurement data. Specifically, first, the control unit 31 stores the measurement data in the storage unit 34. The determination unit 32 then executes analysis processing for determining whether the measurement data satisfies a predetermined condition by using the inspection model, and specifying a generation component that has generated the measurement data. In the present embodiment, the analysis processing is executed to determine whether the measurement data is measurement data generated at the time of the abnormality, and specify the generation component that has generated the measurement data. The generation component resulting from this processing is then displayed on the display screen/interface unit 28 by processing of the control unit 31.

Note that the analysis processing includes the following processing. First, an abnormal waveform (frequency component) is extracted from the measurement data (this example will be described later with reference to FIGS. 4 to 6). Then, it is determined that extracted frequency component is abnormal if similarity between the extracted frequency component and a frequency component that is the inspection model satisfies the predetermined condition. In addition, a characteristic at the time of the abnormality is stored as the inspection model, and it is determined whether the extracted abnormal waveform satisfies the characteristic, so that the generation component is specified. An input sound-sound collection position correspondence table 341 illustrated in FIG. 11 is used to specify the generation component. That is, from the input sound-sound collection position correspondence table 341, a sound pattern that is an example of the inspection model is specified, and the generation component associated with the sound pattern is specified. That is, the generation component that generates a sound generated at the time of the abnormality is specified.

Furthermore, when determining a replacement time of a component such as a consumable, the determination unit 32 determines whether the measurement data is generating a sound indicating the replacement time, in this step S103. In this example, when a component is worn out, a metal piece or the like appears on a surface, and a peculiar sound generated when this metal piece and another component are rubbed is used. In this example, the determination unit 32 determines whether the measurement data is this peculiar sound. Furthermore, the determination unit 32 executes analysis processing for specifying the generation component that has generated this peculiar sound. In this case, a model corresponding to the above peculiar sound is used as the inspection model.

Furthermore, as another example, the determination unit 32 may determine whether the measurement data requires a remeasurement. In this example, the determination unit 32 determines whether the measurement data has a magnitude that requires the remeasurement. In this example, a volume threshold is used instead of the inspection model. Furthermore, the determination unit 32 specifies a component has generated this measurement data, as in the above-described example.

Next, in step S104, the determination unit 32 determines whether the generation component exists in a plurality in the hoistway. That is, in a case where the predetermined condition regarding the abnormality or the replacement time is satisfied, it is determined whether the plurality of generation components that generates similar frequency components exists in the hoistway to be inspected. This is determined by use of the number of individuals in the input sound-sound collection position correspondence table 341. Note that it may be determined whether the plurality of generation components that generates similar frequency components exists, based on structural data of the elevator stored in the storage unit 34.

Furthermore, the similar frequency components include not only exactly the same frequency components but also similar frequency components whose similarity in an amplitude and a generation time satisfies predetermined conditions. Therefore, in addition to a case where a plurality of components of the same type exists, components of different types that generate similar frequency components are also included.

As a result of the above determination in step S104, in a case of "Yes", that is, in a case where it is determined that the plurality of generation components exists, the processing proceeds to step S105, and in a case of "No", that is, in a case where it is determined that the plurality of generation components does not exist, the processing proceeds to step S109. Note that, in the present embodiment, an example of determining whether there is the plurality of components of the same type as the generation components will be described. Therefore, in FIG. 2, as examples in the case of "Yes", the top pulleys 6*a* and 6*b*, the car pulleys 8*a* and 8*b*, the car rails 9*a* and 9*b*, and the counterweight rails 10*a* and 10*b* are described as the generation components. Furthermore, in FIG. 2, a machine, a brake, and a governor are described as examples in the case of "No".

Note that in a case where it is determined whether the remeasurement is necessary, this step 104 may be omitted. In this case, the processing proceeds from step S103 to step S105.

Figure 3:
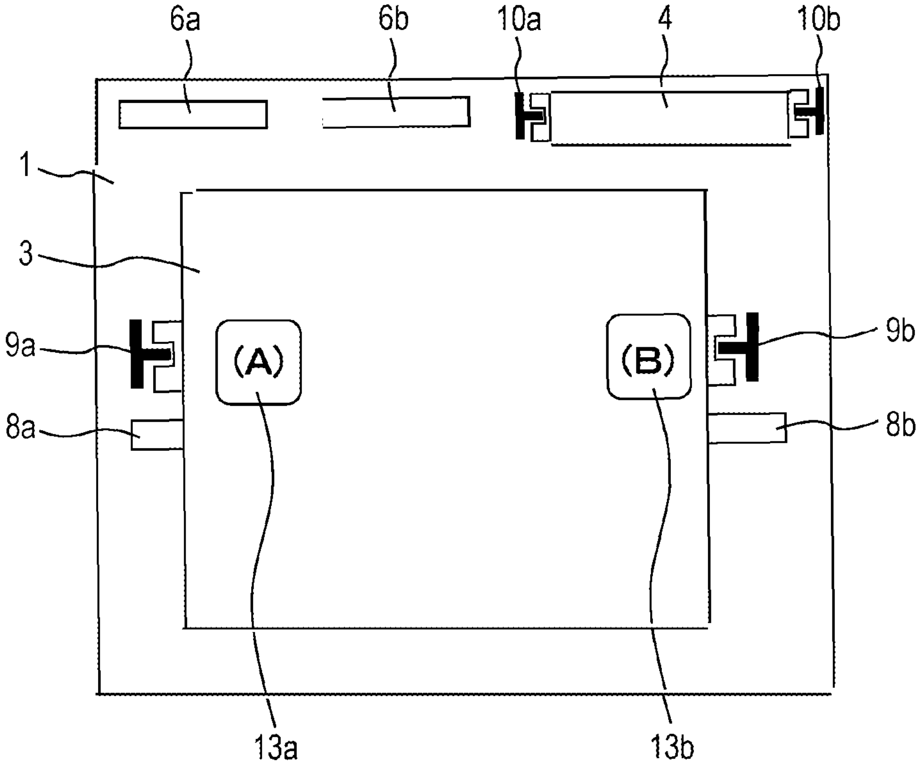
FIG. 3 is a schematic diagram illustrating remeasurement position indicating positions in a case where an abnormality has occurred in a car pulley or a car rail in the embodiment of the present invention.
Figure 6:
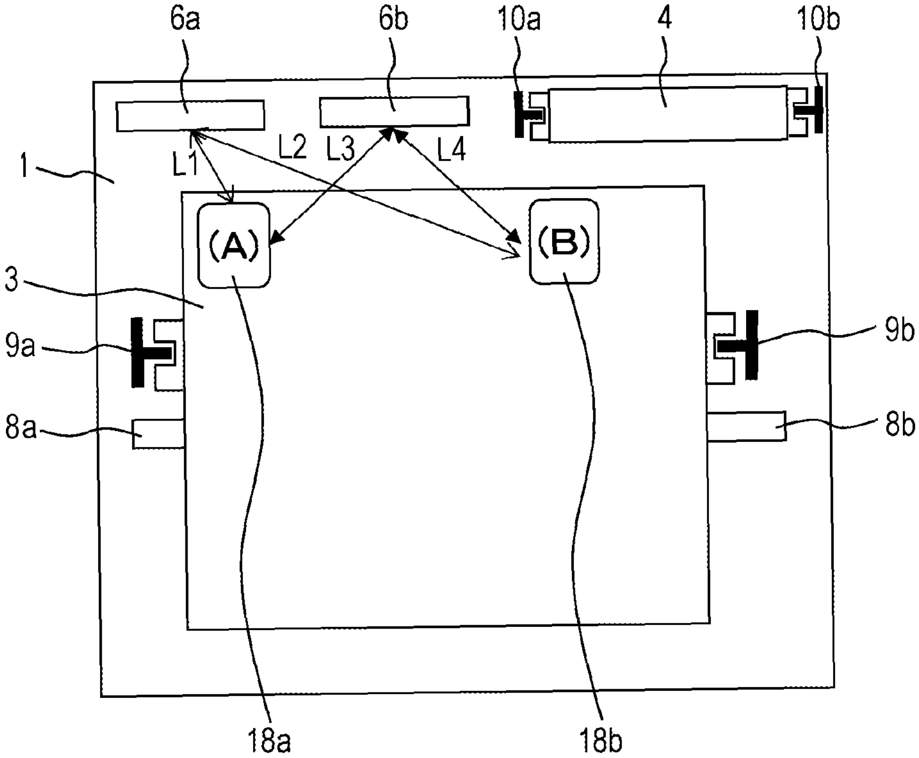
FIG. 6 is a schematic diagram illustrating remeasurement position indicating positions in a case where a sound generated at the time of an abnormality in a top pulley has been generated in the embodiment of the present invention.
Figure 8:
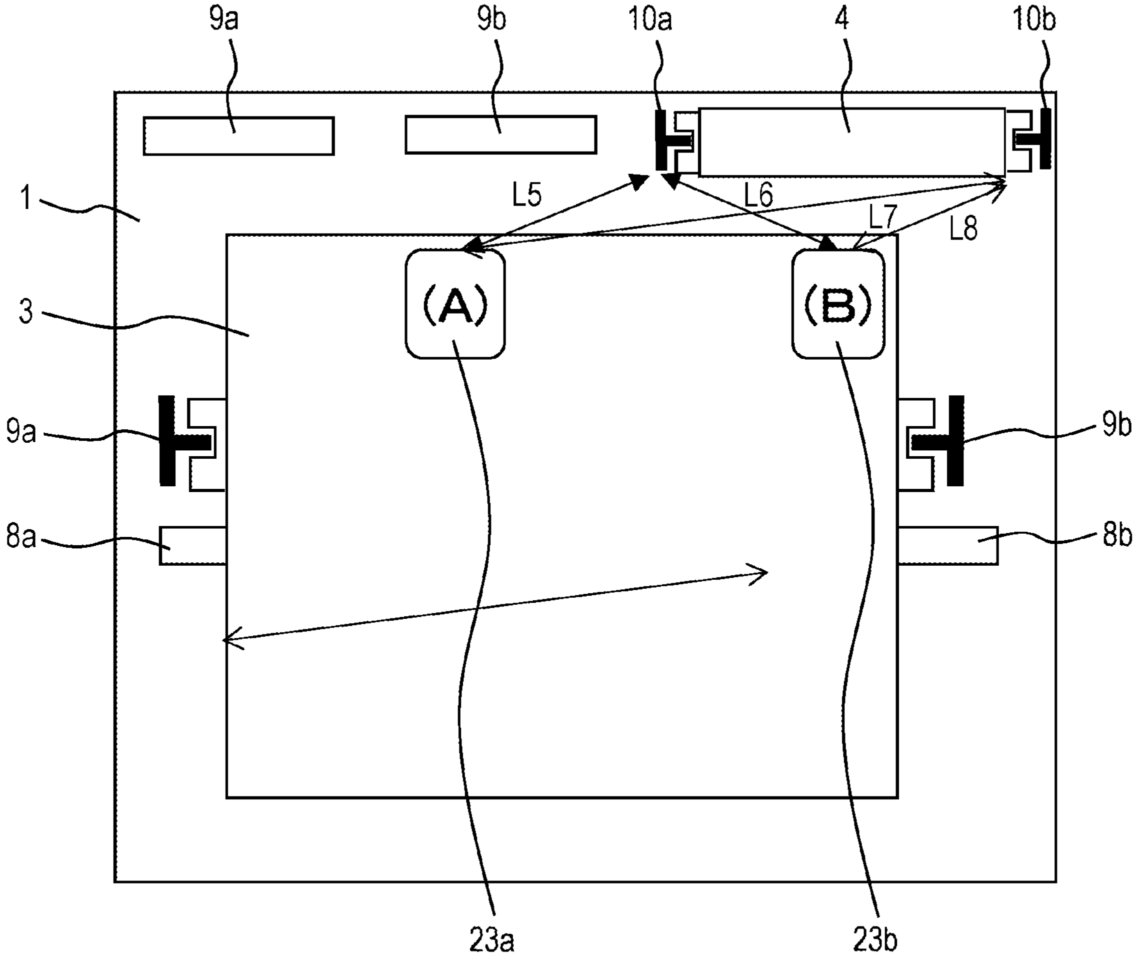
FIG. 8 is a schematic diagram illustrating remeasurement position indicating positions in a case where a sound generated at the time of an abnormality in a counterweight rail has been generated in the embodiment of the present invention.

Next, in step S105, the control unit 31 displays a remeasurement position on the display screen/interface unit 28. This display is performed in order to specify an individual where a failure has occurred (hereinafter referred to as an occurrence individual) from the generation components determined to be exist in a plurality in S104. Specific display contents include a name of a generation component, a remeasurement instruction, and an installation position of the smart device at the time of the remeasurement. Here, examples of the remeasurement position of the smart device 11 are illustrated in FIGS. 3, 6, and 8. Reference signs 13*a* and 13*b* in FIG. 3, reference signs 18*a* and 18*b* in FIG. 6, and reference signs 23*a* and 23*b* in FIG. 8 indicate the remeasurement positions. In this example, since there are two generation components, two remeasurement positions are specified and displayed so that relative positions from each of the generation components are different from each other. Here, if it is determined that there are three generation components, three positions are displayed as the remeasurement positions. Note that these will be described later. Note that, in the present embodiment, a plurality of remeasurement positions is displayed, but in a case where there is one individual of the component, the remeasurement position may be set to one position.

Next, the smart device 11 is arranged by the user at the above-described remeasurement positions. Processing of step S106 is then executed for each remeasurement position. For example, in the example of FIG. 3, the smart device 11 is arranged at a remeasurement position (A) 13*a*, and the remeasurement in step S106 is performed. The user then moves the smart device 11 to the vicinity of a remeasurement position (B) 13*b*, and performs the remeasurement in step S106. In this way, step S106 is executed for the number of the generation components. Note that the processing of step S106 is executed similarly to that of step S102.

Next, in step S107, the determination unit 32 compares and analyzes results of step S106. As a result, an individual satisfying the predetermined condition is specified. In the present embodiment, an abnormal individual is specified. Furthermore, in the above-described determination of the replacement time, an individual that needs to be replaced is specified.

Hereinafter, specific contents of steps S105 and S107 will be described with reference to FIGS. 3 to 15 by taking the abnormality determination as an example. In the following, three examples will be described in which the generation components determined to be abnormal are (1) the car pulleys 8*a* and 8*b*, (2) the top pulleys 6*a* and 6*b*, and (3) the counterweight rails 10*a* and 10*b*. Furthermore, in the description of (2) the top pulleys 6*a* and 6*b*, details of step S105 will also be described.

First, with reference to FIGS. 3 and 4, an example will be described in which the generation components determined to generate the sound generated at the time of the abnormality in step S103 are the car pulleys 8*a* and 8*b*. Furthermore, with reference to FIGS. 3 and 5, an example will be described in which the generation components determined to be abnormal in step S103 are the car rails 9*a* and 9*b*.

FIG. 3 is a schematic diagram illustrating the remeasurement positions (A) 13*a* and (B) 13*b* displayed on the display screen/interface unit 28 in a case where the generation components determined to be abnormal in step S103 are two car pulleys 8*a* and 8*b* or two car rails 9*a* and 9*b*, which exist in the hoistway. In this example, the smart device 11 is displayed so as to be arranged at the remeasurement position (A) 13*a* in the vicinity of the car pulley 8*a* and the car rail 9*a* and the remeasurement position (B) 13*b* in the vicinity of the car pulley 8*b* and the car rail 9*b*.

In step S107, the determination unit 32 then determines the abnormal individual based on remeasurement data obtained by the remeasurement in step S106. A method of this determination will be described with reference to FIG. 4.

Figure 4:
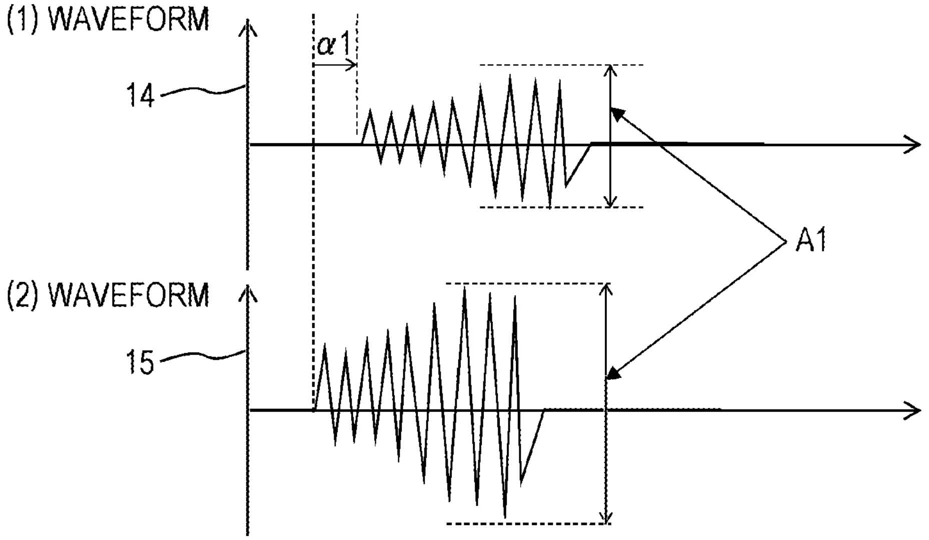
FIG. 4 is a schematic diagram illustrating waveforms of a sound generated at the time of an abnormality in the car pulley in the embodiment of the present invention.

FIG. 4 is a schematic diagram illustrating waveforms 14 and 15 based on the measurement data obtained by a measurement at the remeasurement positions (A) 13*a* and (B) 13*b* in FIG. 3 by use of the smart device 11 in a case where the sound generated at the time of the abnormality has been generated in the car pulley 8*b*. The processing of determining the occurrence individual will be described with reference to FIGS. 3 and 4. Here, the waveforms 14 and 15 are obtained by extracting frequency components indicating the abnormality from the measurement data. This also applies to FIGS. 5, 7 and 9 below.

In the waveforms 14 and 15, input to the sensor in the smart device 11 is earlier and an amplitude is larger as a distance from a component to be measured is shorter. That is, in the measurement when the abnormality has occurred in the car pulley 8*b* (remeasurement of S106), results of comparing the waveforms 14 and 15 measured at the remeasurement positions (A) 13*a* and (B) 13*b* are as follows. The signal generation time is earlier by α1 in the waveform 15 at the remeasurement position (B) 13*b* than in the waveform 14 at the remeasurement position (A) 13*a*, and an amplitude A1 of the waveform 15 is larger than that of the waveform 14. As a result, it is possible to determine that the occurrence individual where the abnormality has occurred is not the car pulley 8*a* but the car pulley 8*b*. Note that the generation time is also a measured time.

Figure 5:
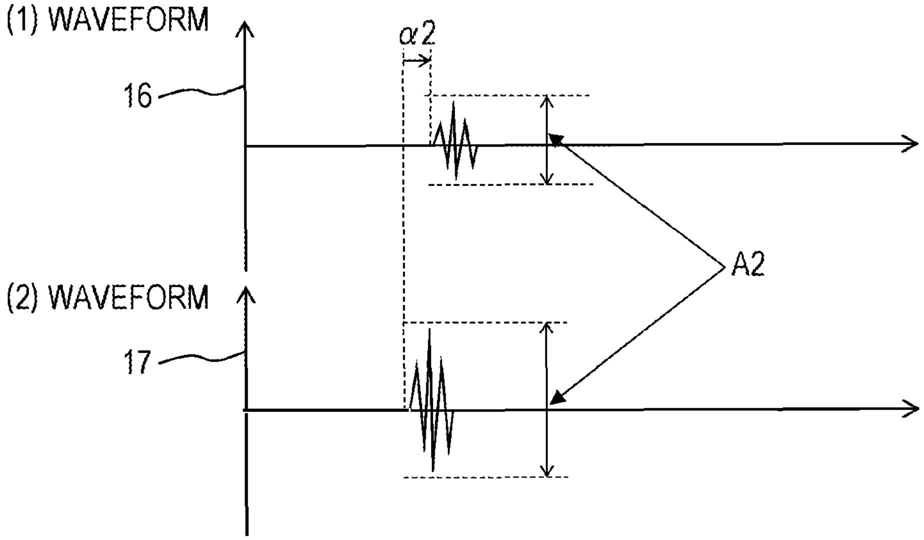
FIG. 5 is a schematic diagram illustrating waveforms of a sound generated at the time of an abnormality in the car rail in the embodiment of the present invention.

Next, the example in which the car rails are determined as the generation components will be described. FIG. 5 is a schematic diagram illustrating waveforms 16 and 17 based on the measurement data obtained by a measurement at the remeasurement positions (A) 13*a* and (B) 13*b* in FIG. 3 by use of the smart device 11 in a case where the abnormality has occurred in the car rail 9*b*. The processing of determining the occurrence individual will be described with reference to FIGS. 3 and 5.

In the measurement when the abnormality has occurred in the car rail 9*b* (remeasurement of S106), a distance from the car rail 9*b* where the abnormality has occurred is closer to the remeasurement position (B) 13*b* than to the remeasurement position (A) 13*a*. Therefore, when the waveforms 16 and 17 measured at the remeasurement positions (A) 13*a* and (B) 13*b* are compared, the signal generation time is earlier by α2 at the remeasurement position (B) 13*b* than at the remeasurement positions (A) 13*a*, and an amplitude A2 of the waveform 17 is larger than that of the waveform 16. As a result, it is possible to determine that the occurrence individual where the abnormality has occurred is the car rail 9*b*.

Next, with reference to FIGS. 6 and 7, processing in a case where the generation components determined to be abnormal in step S103 are two top pulleys 6*a* and 6*b*, which exist in the hoistway, will be described. FIG. 6 is a schematic diagram illustrating remeasurement positions (A) 18*a* and (B) 18*b* displayed on the display screen/interface unit 28 in step S105 (display of the remeasurement positions). In this example, the smart device 11 is arranged at the remeasurement position (A) 18*a* in the vicinity of the top pulley 6*a* and the remeasurement position (B) 18*b* whose distance from the top pulley 6*b* is equal to a distance from the top pulley 6*b* to the remeasurement position (A) 18*a*. In this example, the remeasurement positions are set such that one of the plurality of generation components is substantially equidistant from both of the remeasurement positions, and another one of the plurality of generation component is closer to either of the remeasurement positions.

Here, details of processing for performing the display as illustrated in FIG. 6 will be described. First, various information used in this processing will be described. In this processing, the input sound-sound collection position correspondence table 341 stored in the storage unit 34 is used. As illustrated in FIG. 11, the input sound-sound collection position correspondence table 341 stores the sound pattern, the generation component, the number of individuals, component arrangement pattern identification information, and sound collection position identification information in association with each other. As the sound pattern, characteristics of a sound in a case where a failure has occurred in the corresponding component, such as a continuous sound, a radio frequency (frequency), and an impact sound, are recorded. Furthermore, as the sound pattern, graph information indicating a frequency may be recorded. Moreover, vibration information may be recorded in addition to or instead of the sound.

Furthermore, the generation component is information for specifying the component where the failure has occurred, and a name such as the top pulley may be recorded, or ID information such as a number may be recorded. In addition, the number of individuals indicates the number of individuals in the corresponding components installed in the elevator.

Furthermore, the component arrangement pattern identification information is sets of information ((1) to (4)) for identifying a component arrangement pattern that specifies a position where the failed component is arranged in the elevator. This component arrangement pattern identification information is associated with component arrangement patterns 342 stored in the storage unit 34. Furthermore, the sound collection position identification information is sets of information ((1) to (4)) for identifying a sound collection position that is contents to be displayed on the display screen/interface unit 28. In addition, the sound collection position identification information is associated with sound collection positions 343 stored in the storage unit 34. Note that, in the input sound-sound collection position correspondence table 341, only one of the component arrangement pattern and the sound collection position may be recorded if the component arrangement pattern and the sound collection position are used as common information.

Next, detailed contents of step S105 using the various information described above will be described. The control unit 31 specifies the component arrangement pattern identification information and the sound collection position identification information associated with the generation components specified in step S103 from the input sound-sound collection position correspondence table 341. In this example, since the generation components are the top pulleys, sets of component arrangement pattern identification information (1) to (4) and sets of sound collection position identification information (1) to (4) are specified.

Figure 12:
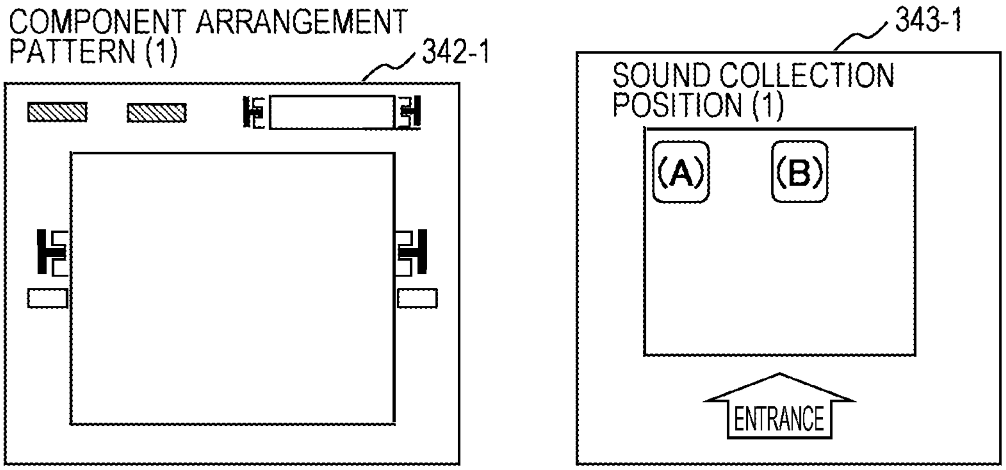
FIG. 12 is a diagram illustrating a component arrangement pattern and a sound collection position in the embodiment of the present invention.
Figure 13:
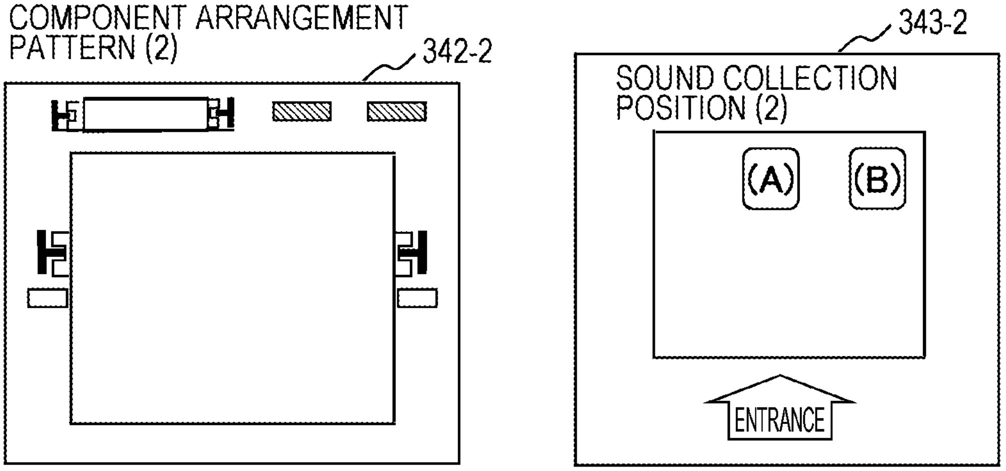
FIG. 13 is a diagram illustrating a component arrangement pattern and a sound collection position in the embodiment of the present invention.
Figure 14:
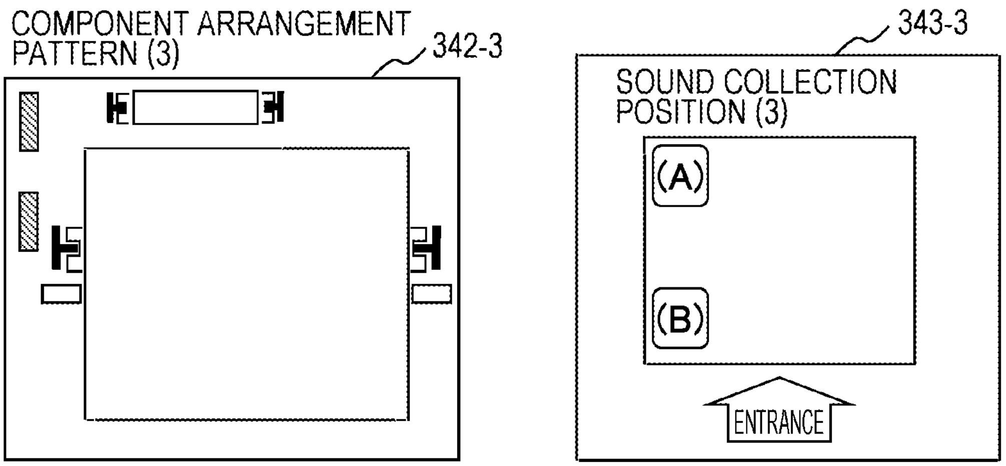
FIG. 14 is a diagram illustrating a component arrangement pattern and a sound collection position in the embodiment of the present invention.
Figure 15:
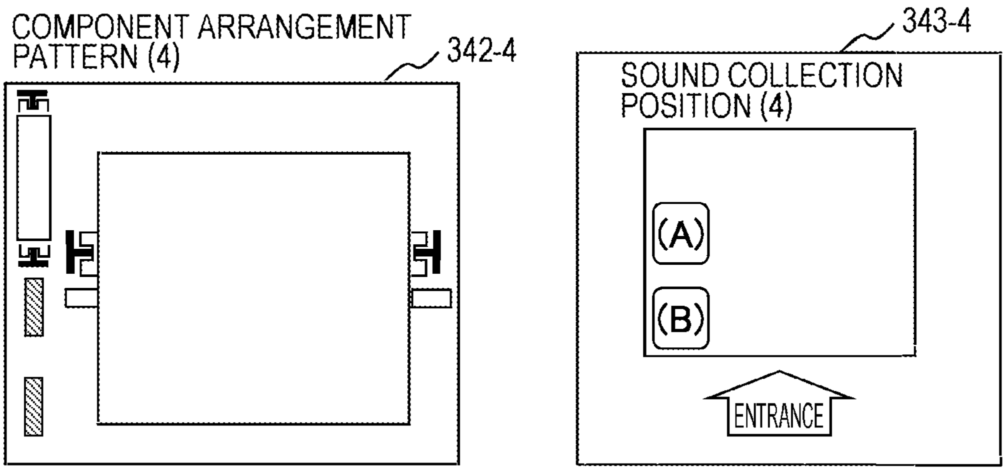
FIG. 15 is a diagram illustrating a component arrangement pattern and a sound collection position in the embodiment of the present invention.

Next, the control unit 31 extracts, from the component arrangement patterns 342 and the sound collection positions 343, information corresponding to the specified sets of component arrangement pattern identification information (1) to (4) and sound collection position identification information (1) to (4). That is, component arrangement patterns 342-1 to 342-4 and sound collection positions 343-1 to 343-4 illustrated in FIGS. 12 to 15 are extracted. Here, FIGS. 12 to 15 illustrate the component arrangement patterns 342-1 to 342-4 and the sound collection positions 343-1 to 343-4 for each set of arrangement positions of the top pulleys 6*a* and 6*b*. Hatched portions of the component arrangement patterns 342-1 to 342-4 in FIGS. 12 to 15 indicate the arrangement positions of the top pulleys 6*a* and 6*b*. That is, FIG. 12 illustrates the top pulleys 6*a* and 6*b* arranged horizontally in an upper left part of the drawing (the case of FIG. 6, which corresponds to this example), FIG. 13 illustrates the top pulleys 6*a* and 6*b* arranged horizontally in an upper right part of the drawing, FIG. 14 illustrates the top pulleys 6*a* and 6*b* arranged vertically in the upper left part of the drawing, and FIG. 15 illustrates the top pulleys 6*a* and 6*b* are arranged vertically in a lower left part of the drawing. In the sound collection positions 343-1 to 343-4, remeasurement positions for each set of arrangement positions of the top pulleys 6*a* and 6*b* are represented as (A) and (B).

Next, the control unit 31 performs a predetermined display regarding these contents on the display screen/interface unit 28. In this example, the sound collection position in FIG. 6, that is, the sound collection position 343-1 in FIG. 12 is displayed, but the display is not limited to these contents. That is, the predetermined display includes display by use of design information and display of information specified according to a designation from the user.

For example, the design information of the elevator to be inspected is compared with each of the component arrangement patterns 342-1 to 342-4, and the corresponding component arrangement pattern is specified. A sound collection position associated with the corresponding component arrangement pattern is then displayed.

In addition, each of the sound collection positions 343-1 to 343-4 may be displayed on the smart device 11 to prompt the user to make a selection. Furthermore, each of the component arrangement patterns 342-1 to 342-4 may be displayed on the smart device 11 to prompt the user to make a selection. In this case, a sound collection position associated with the selected component arrangement pattern is displayed.

Moreover, as a preliminary preparation for the inspection, the smart device 11 may accept, from the user, a selection of a set of the component arrangement pattern identification information in the elevator to be inspected. In this case, a set of sound collection position identification information associated with the selected set of component arrangement pattern identification information is activated as an extraction target, so that a sound collection position to be displayed can be specified.

Note that the component arrangement pattern may be displayed instead of the sound collection position. In this case, the user confirms positions of the generation components (hatched portions in FIGS. 12 to 15) and arranges the smart device 11 at the remeasurement positions according to the positions of the generation components.

Furthermore, in the present embodiment, the input sound-sound collection position correspondence table 341 may store the component arrangement pattern and the sound collection position instead of the component arrangement pattern identification information and the sound collection position identification information, respectively. Furthermore, the storage of the component arrangement pattern and the sound collection position may be omitted.

The detailed description of the processing for displaying is completed here.

Next, processing of determining the occurrence individual in step S107 in this example will be described with reference to FIG. 7.

Figure 7:
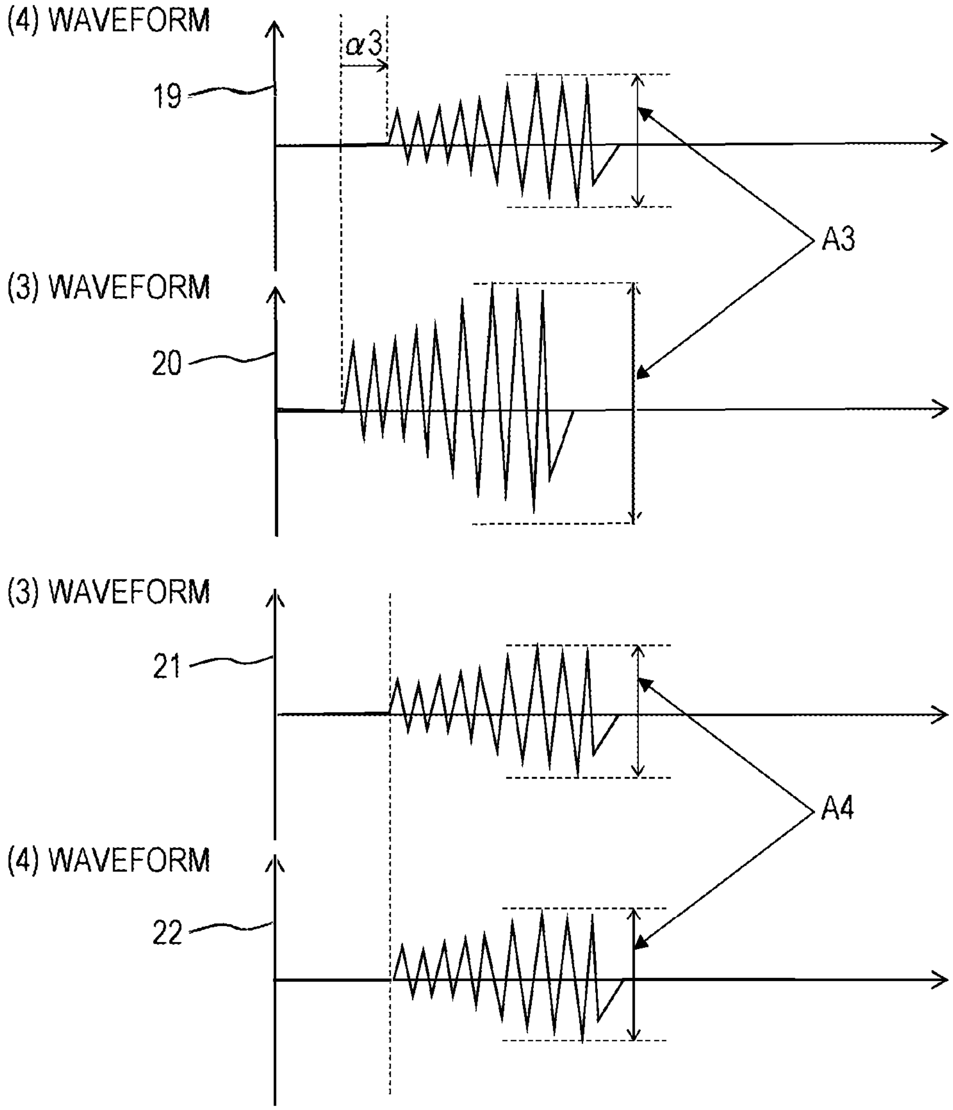
FIG. 7 is a schematic diagram illustrating waveforms of a sound generated at the time of an abnormality in the top pulley in the embodiment of the present invention.

FIG. 7 is a schematic diagram illustrating waveforms 19 to 22 based on the measurement data obtained by a measurement in which the smart device 11 is arranged at the remeasurement positions (A) 18*a* and (B) 18*b* illustrated in FIG. 6 in a case where the abnormality has occurred in either the top pulley 6*a* or 6*b* (the top pulleys 6 are the generation components).

In a case where the abnormality has occurred in the top pulley 6*a*, a relationship between a distance L1 from the top pulley 6*a* to the remeasurement position (A) 18*a* and a distance L2 from the top pulley 6*a* to the remeasurement position (B) 18*b* is L1<L2. Therefore, when the waveforms 19 and 20 are compared, the signal generation time is earlier by α3 in the waveform 20 at the remeasurement position (A) 18*a*, which is closer to the top pulley 6*a* where an abnormal sound or vibration has been generated, than in the waveform 19 at the remeasurement position (B) 18*b*, and an amplitude A3 of the waveform 20 is larger than that of the waveform 19. As a result, it is possible to determine that the occurrence individual where the abnormality has occurred is the top pulley 6*a*.

On the other hand, in a case where the abnormality has occurred in the top pulley 6*b*, a distance L3 from the top pulley 6*b* to the remeasurement position (A) 18*a* and a distance L4 from the top pulley 6*b* to the remeasurement position (B) 18*b* are substantially equal (L3=L4), and thus the waveforms 21 and 22 are substantially equal. Here, a state where the waveforms may be substantially equal may be a case where either a magnitude of the amplitude or the generation time is substantially equal. As a result, it is possible to determine that the occurrence individual where the abnormality has occurred is the top pulley 6*b*. Note that, in this example, more desirable remeasurement positions are obtained when positions in the car where the distance L3 is equal to the distance L4 and a difference between the distance L2 and the distance L1 is maximized are set as the remeasurement positions, because the frequency components can be compared more easily.

Next, with reference to FIGS. 8 and 9, processing in a case where the generation components determined to be abnormal in step S103 are two counterweight rails 10*a* and 10*b*, which exist in the hoistway, will be described.

FIG. 8 is a schematic view illustrating remeasurement positions (A) 23*a* and (B) 23*b* displayed on the display screen/interface unit 28. The smart device 11 is arranged at the remeasurement position (B) 23*b* that is closer to the counterweight rail 10*b* than the remeasurement position (A) 23*a*, and the remeasurement position (A) 23*a* whose distance from the counterweight rail 10*a* is equal to a distance from the counterweight rail 10*a* to the remeasurement position (B) 23*b*.

Figure 9:
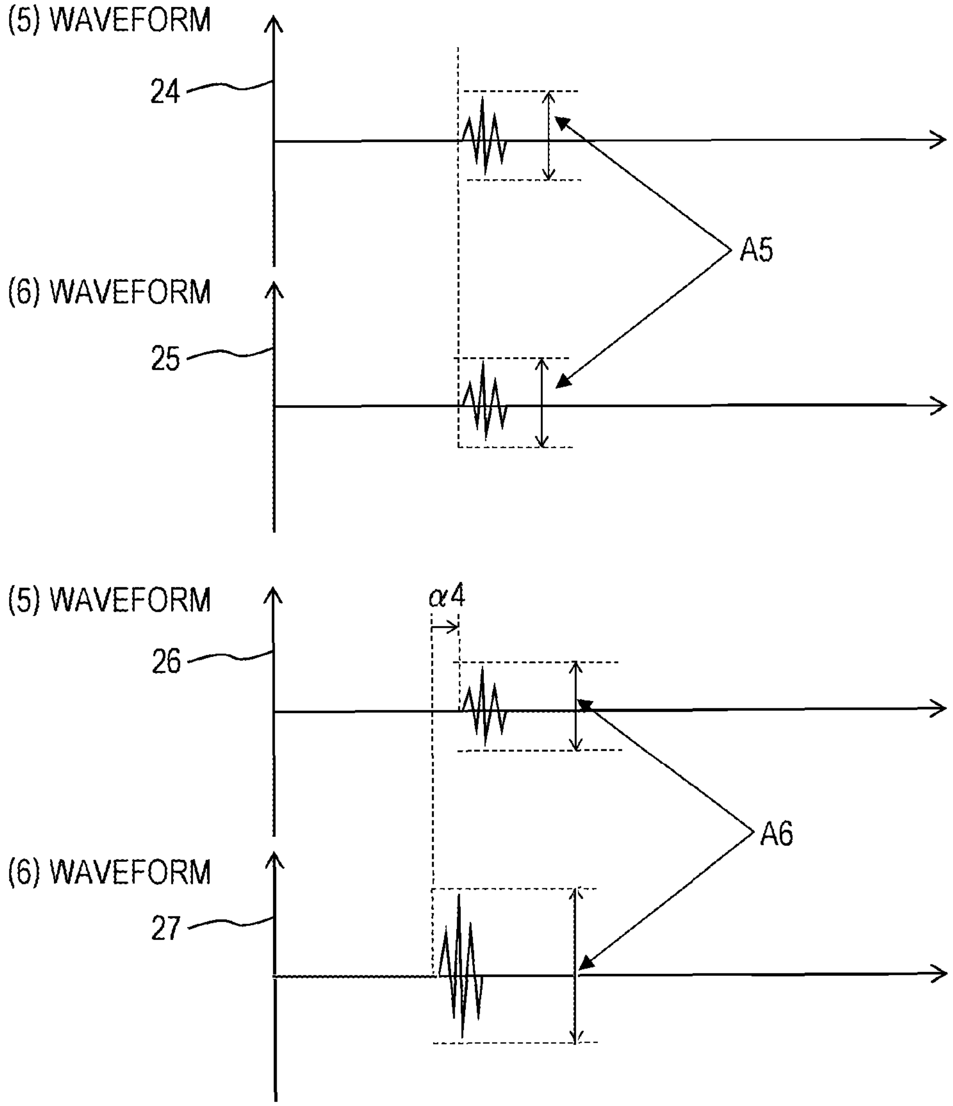
FIG. 9 is a schematic diagram illustrating waveforms of a sound generated at the time of an abnormality in the counterweight rail in the embodiment of the present invention.

FIG. 9 is a schematic diagram illustrating waveforms 24 to 27 based on the measurement data obtained by a measurement in which the smart device 11 is arranged at the remeasurement position (A) 23*a* and (B) 23*b* illustrated in FIG. 8 in a case where the abnormality has occurred in either the counterweight rail 10*a* or 10*b*.

In a case where the abnormality has occurred in the counterweight rail 10*a*, a distance L5 from the counterweight rail 10*a* to the remeasurement position (A) 23*a* and a distance L6 from the counterweight rail 10*a* to the remeasurement position (B) 23*b* are substantially equal (L5=L6). Therefore, the waveforms 24 and 25 are substantially equal. Here, a state where the waveforms may be substantially equal may be a case where either a magnitude of the amplitude or the generation time is substantially equal. As a result, it is possible to determine that the occurrence individual where the abnormality has occurred is the counterweight rail 10*a*.

On the other hand, in a case where the abnormality has occurred in the counterweight rail 10*b*, a relationship between a distance L7 from the counterweight rail 10*b* to the remeasurement position (A) 23*a* and a distance L8 from the counterweight rail 10*b* to the remeasurement position (B) 23*b* is L8<L7. Therefore, when the waveforms 26 and 27 are compared, the signal generation time is earlier by α4 in the waveform 27 at the remeasurement position (B) 23*b*, which is closer to the counterweight rail 10*b* where an abnormal sound has been generated, than in the waveform 26 at the remeasurement position (A) 23*a*, and an amplitude A5 of the waveform 27 is larger than that of the waveform 26. As a result, it is possible to determine that the occurrence individual where the abnormality has occurred is the counterweight rail 10*b*.

As described above, in the present embodiment, magnitudes of amplitudes and generation times of a plurality of frequency components are compared, so that the occurrence individual is specified. However, either one of the comparison results may be used. Furthermore, in a case where the comparison result of the magnitudes of the amplitudes and the comparison result of the generation times are inconsistent or a difference in magnitude is small, the comparison result of the generation time may be used. That is, a component specified by the generation time is determined to be the occurrence individual.

Furthermore, in the present embodiment, in order to make the above comparison, remeasurement positions having different relative positions from the generation components are specified and displayed.

Note that the specific processing of steps S105 and S107 has been described above by taking the abnormality determination as an example, but in a case where the replacement time is determined, the processing is performed based on the sound indicating the replacement time instead of the sound generated at the time of the abnormality, in steps S105 and S107 described above.

The description of step S107 is completed here, and processing of step S108 will be described. In step S108, the control unit 31 displays a direction of the occurrence individual determined in step S107 on the display screen/interface unit 28. This display is performed by use of arrangement information of each component in the elevator stored in the storage unit 34 or the information indicating the arrangement included in the inspection model specified in step S101. At this time, it is desirable to display a layout drawing such as map information on the display screen/interface unit 28, but information for specifying the occurrence individual, such as a component number, may be used.

Furthermore, in a case where it is determined that the plurality of generation components does not exist in step S104 and after step S108, step S109 is executed. In step S109, the control unit 31 performs processing for correcting the determined occurrence individual. This processing includes displaying a repair method for the occurrence individual on the display screen/interface unit 28 and transmitting a stop signal to an elevator control device via the communication unit 33.

According to the present embodiment described above, it is possible to reduce a work time for inspection, excessive repair and replacement of components, and costs.

Furthermore, the present invention is not limited to the above-described embodiment, and various modifications are also included. For example, it is possible to reduce the number of measurements by replacing the first measurement (step S102) with the first remeasurement in step S106. Furthermore, a directional microphone may be used as the microphone 30, and sounds in a plurality of directions may be measured by use of the directional microphone, so that the number of measurements may be one.

Furthermore, the remeasurement in the present embodiment (measurement at the remeasurement positions (A) and (B)) includes a plurality of measurements using one smart device, measurements with a smart device and a sensor (for example, microphone) connected to the smart device, and measurements with a plurality of smart devices. Here, the measurements with the smart device and the sensor (for example, microphone) connected to the smart device and the measurements with the plurality of smart devices include measurements at the same time.

Furthermore, in the present embodiment, the occurrence individual is determined for components arranged in a plane. As for components arranged in a vertical direction (height direction), it is possible to use another logic that uses an arrangement position (height) of the component. Therefore, by combining these logics, it is possible to perform the abnormality inspection on components arranged in the horizontal direction and the vertical direction. Furthermore, this determination of the individual can be used in other examples such as determination of the replacement time.

Moreover, in the present embodiment, measurement results are used for the inspection, but the inspection does not have to be targeted, and the inspection may be omitted.

What is claimed is:

1. An elevating machine inspection device that inspects an elevating machine based on measurement data that is a result of measuring a sound generated from the elevating machine, the elevating machine inspection device comprising:

a model selection unit that accepts a model of the elevating machine;

a measurement unit that measures the measurement data of the elevating machine;

a storage unit that stores a component table storing, for each model, components that form the elevating machine, sounds, and sound measurement positions in the model in association with each other;

a control unit that specifies a first component of the components generating a sound satisfying a predetermined condition, by use of a frequency component of the measurement data stored in the component table; and an output unit that outputs information for specifying a first sound measurement position of the sound measurement positions corresponding to the first component;

wherein the component table stores the number of components used in the model, and in a case where a plurality of the components of a same type that generates the sound satisfying the predetermined condition is used, the component table stores sound measurement positions for specifying which of the plurality of components used generates the sound satisfying the predetermined condition.

2. The elevating machine inspection device according to claim 1, wherein the control unit specifies the first component generating the sound satisfying the predetermined condition by use of measurement data at a plurality of sound measurement positions.

3. The elevating machine inspection device according to claim 1, wherein the control unit receives, from another elevating machine inspection device, measurement data measured at a same time, and specifies the first component generating the sound satisfying the predetermined condition.

4. An elevating machine inspection method for performing inspection with an inspection device based on measurement data obtained by measurement of a sound generated from an elevating machine, the elevating machine inspection method comprising:

accepting, by a model selection unit, a model of the elevating machine;

measuring, by a measurement unit, the measurement data of the elevating machine;

storing, by a storage unit, a component table storing, for each model, components that form the elevating machine, sounds, and sound measurement positions in the model in association with each other;

specifying, by a control unit, a first component of the components generating a sound satisfying a predetermined condition, by use of a frequency component of the measurement data stored in the component table; and outputting, by an output unit, information for specifying a sound measurement position corresponding to the first component;

wherein the component table stores the number of components used in the model, and in a case where a plurality of the components of a same type that generates the sound satisfying the predetermined condition is used, the component table stores sound measurement positions for specifying which of the plurality of components used generates the sound satisfying the predetermined condition.

* * * * *